(12) United States Patent
Perez et al.

(10) Patent No.: US 7,335,007 B2
(45) Date of Patent: Feb. 26, 2008

(54) QUICK CHANGE MOLD

(75) Inventors: Gilles Perez, Vourles (FR); Michel Romand, Serrieres-de-Briord (FR); Brice Arlaud, Lyons (FR)

(73) Assignee: Graham Packaging Company, L.P., York, PA (US)

( * ) Notice: Subject to any disclaimer, the term of this patent is extended or adjusted under 35 U.S.C. 154(b) by 375 days.

(21) Appl. No.: 11/108,062

(22) Filed: Apr. 18, 2005

(65) Prior Publication Data

US 2006/0233909 A1 Oct. 19, 2006

(51) Int. Cl.
*B29C 49/36* (2006.01)

(52) U.S. Cl. ............. 425/195; 425/182; 425/522; 425/532; 425/541

(58) Field of Classification Search ............. 425/182, 425/195, 522, 532, 541; 249/102; 264/527
See application file for complete search history.

(56) References Cited

U.S. PATENT DOCUMENTS

| | | | | |
|---|---|---|---|---|
| 3,294,885 A | * | 12/1966 | Cines et al. | 264/527 |
| 3,380,121 A | * | 4/1968 | Chittenden et al. | 425/528 |
| 3,901,638 A | * | 8/1975 | Yoshikawa et al. | 425/326.1 |
| 3,912,435 A |   | 10/1975 | Waring | |
| 3,969,062 A | * | 7/1976 | Komarek | 425/471 |
| 4,058,284 A | * | 11/1977 | Rath | 249/163 |
| 5,118,460 A | * | 6/1992 | Rydmann | 264/509 |
| 5,849,342 A |   | 12/1998 | Uchiyama et al. | |
| 6,113,377 A | * | 9/2000 | Clark | 425/195 |
| 6,139,790 A |   | 10/2000 | Bogen et al. | |
| 6,615,472 B2 | * | 9/2003 | Petre | 29/426.1 |
| 6,948,924 B2 | * | 9/2005 | Tsau et al. | 425/195 |
| 2003/0124212 A1 |   | 7/2003 | Petre | |

OTHER PUBLICATIONS

International Search Report of Sep. 6, 2006 for PCT/US2006/014754.

* cited by examiner

*Primary Examiner*—Robert B. Davis
(74) *Attorney, Agent, or Firm*—Knoble Yoshida & Dunleavy, LLC

(57) ABSTRACT

A mold insert set is provided for use with a mold system having first and second mold bodies, the first and second mold bodies aligning opposite each other during a molding process. Each of the mold bodies has at least one insert receiving region for replaceably receiving an insert of the mold insert set. Each of the inserts has an insert body, a mold cavity formed in the insert body, the mold cavity being for forming an object, and an opening in the mold cavity for aligning with a gas injection region of the mold body in which the insert is received. The gas injection region is where blow gas is introduced to the mold cavity for forming the object.

21 Claims, 7 Drawing Sheets

QUICK CHANGE MOLD

BACKGROUND OF THE INVENTION

The present invention relates generally to molds, and more particularly to molds for molding plastic bottles.

Extrusion-type blow mold machines are used for blow molding bottles and other plastic containers. These blow mold machines typically have a number of removable molds (for example, 12 or 24). The removable molds are specific to a particular bottle or container and must be changed to produce a different bottle or container. The operation of changing the molds of a conventional extrusion-type blow mold machine can be labor intensive and require a long shut down period. Typically, each mold includes a number of connections and devices that require disconnecting and reconnecting each time the molds are changed. In addition, conventional molds can be very heavy and large, requiring additional manpower and or machinery to move and position.

BRIEF SUMMARY OF THE INVENTION

The present invention provides an improved mold insert set for use with a mold system having first and second mold bodies, the first and second mold bodies aligning opposite each other during a molding process. Each of the mold bodies has at least one insert receiving region for replaceably receiving an insert of the mold insert set. Each of the inserts has an insert body, a mold cavity formed in the insert body, the mold cavity being for forming an object, and an opening in the mold cavity for aligning with a gas injection region of the mold body in which the insert is received. The gas injection region is where blow gas is introduced to the mold cavity for forming the object.

Other embodiments of the invention provide a mold system for forming at least one object. The system has a first mold body having at least one insert receiving region and at least one gas injection region; a second mold body aligning with the first mold body and having at least one insert receiving region and at least one gas injection region; and a plurality of mold inserts. Each of the plurality of mold inserts has an insert body, a mold cavity formed in the insert body, the mold cavity being for forming one of the at least one object, and an opening in the mold cavity for aligning with one of the gas injection regions. Each of the mold inserts fits into one of the insert receiving regions and the gas injection regions are for introducing blow gas from outside the mold bodies to each of the mold cavities for forming the at least one object.

Other embodiments of the invention provide an extrusion-type blow mold machine having a plurality of two-part molds attached to the machine platens. Each two-part mold has a first mold body having at least one insert receiving region and at least one gas injection region; a second mold body aligning with the first mold body and having at least one insert receiving region and at least one gas injection region; and a plurality of mold inserts. Each mold insert has an insert body; a mold cavity formed in the insert body, the mold cavity being for forming at least one object; and an opening in the mold cavity for aligning with one of the gas injection regions. Each of the mold inserts fits into one of the insert receiving regions and the gas injection regions are for introducing blow gas from outside the mold bodies to each of the mold cavities for forming the at least one object. Utility sources (i.e. air and water) can be connected to the mold body and then either directly or indirectly connected to the mold inserts. Cooling water, for example, can be circulated in the mold body and/or in the mold inserts.

Further objectives and advantages, as well as the structure and function of preferred embodiments will become apparent from a consideration of the description, drawings, and examples.

BRIEF DESCRIPTION OF THE DRAWINGS

The foregoing and other features and advantages of the invention will be apparent from the following, more particular description of preferred embodiments of the invention, as illustrated in the accompanying drawings wherein like reference numbers generally indicate identical, functionally similar, and/or structurally similar elements.

DETAILED DESCRIPTION OF THE INVENTION

Embodiments of the invention are discussed in detail below. In describing embodiments, specific terminology is employed for the sake of clarity. However, the invention is not intended to be limited to the specific terminology or extrusion process so selected. While specific exemplary embodiments are discussed, it should be understood that this is done for illustration purposes only. A person skilled in the relevant art will recognize that other components and configurations can be used without parting from the spirit and scope of the invention. All references cited herein are incorporated by reference as if each had been individually incorporated.

Embodiments of the invention improve upon the conventional molds for use with, for example, an extrusion-type blow mold machine by providing a smaller and lighter removable element of the mold. The invention permits the removal of only that portion of the mold that needs to be replaced to change the configuration of the bottle or container being produced. Parts of the conventional mold design that are the same regardless of the bottle or container being produced need not be a part of the interchangeable mold element of the invention. As a result, the size and weight of the interchangeable parts of the molds in accordance with the invention are greatly reduced relative to a conventional mold.

The smaller size and weight of the mold inserts of the invention greatly reduces the amount of time needed to change the molds of a molding machine. For example, a wheel-type blow mold machine that has 24 conventional molds requires approximately 50-60 hours to replace and adjust all 24 molds. By using molds in accordance with the invention, this time can be reduced to a total of four hours or less. As a result, the invention can provide an additional two days (or more) of production over the conventional system every time the molds are changed.

Figure 1:
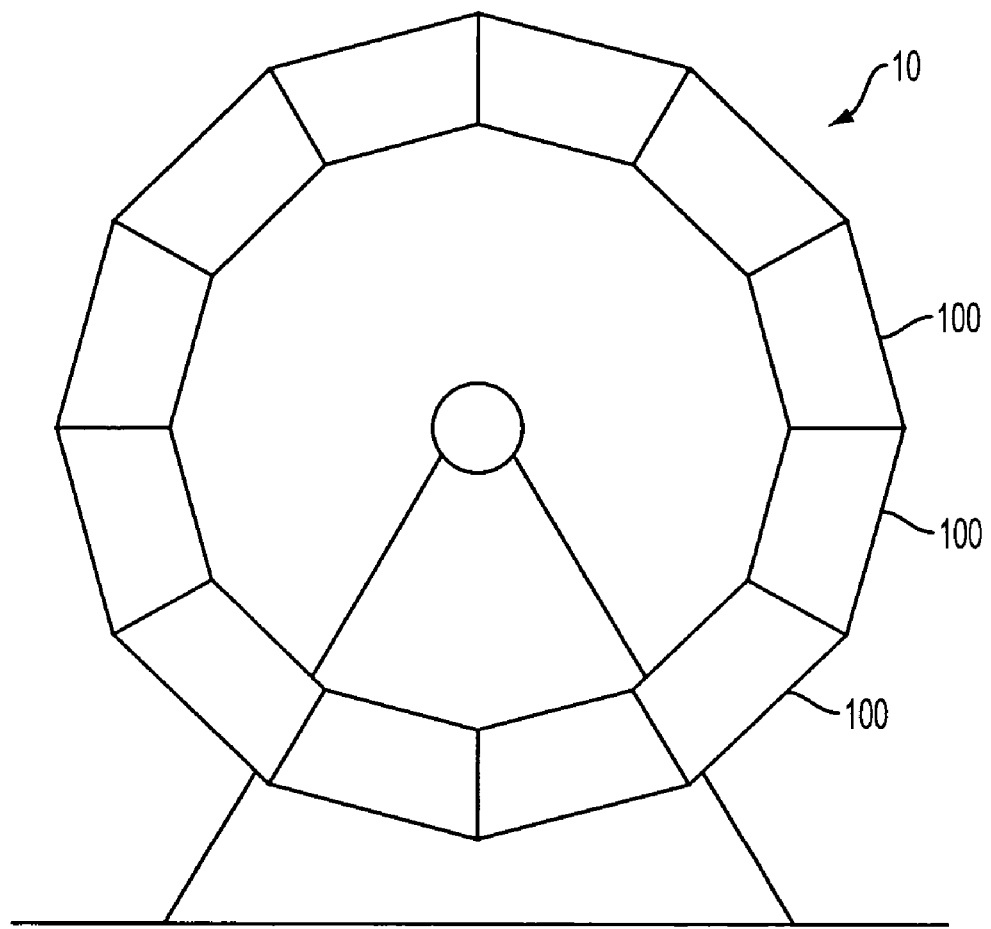
FIG. 1 is a schematic view of an example of a blow mold machine in accordance with an embodiment of the invention.

As an example of a mold machine in accordance with the invention, a schematic view of a wheel-type blow mold machine 10 having a plurality (twelve in this example) of molds 100 arranged around its perimeter is shown in FIG. 1. Each mold 100 has two mold bodies 110 that face each other and, when closed against each other, form the complete mold 100. A wheel-type blow mold machine is used as an example, but the invention also applies to other types of blow mold machines.

Figure 2:
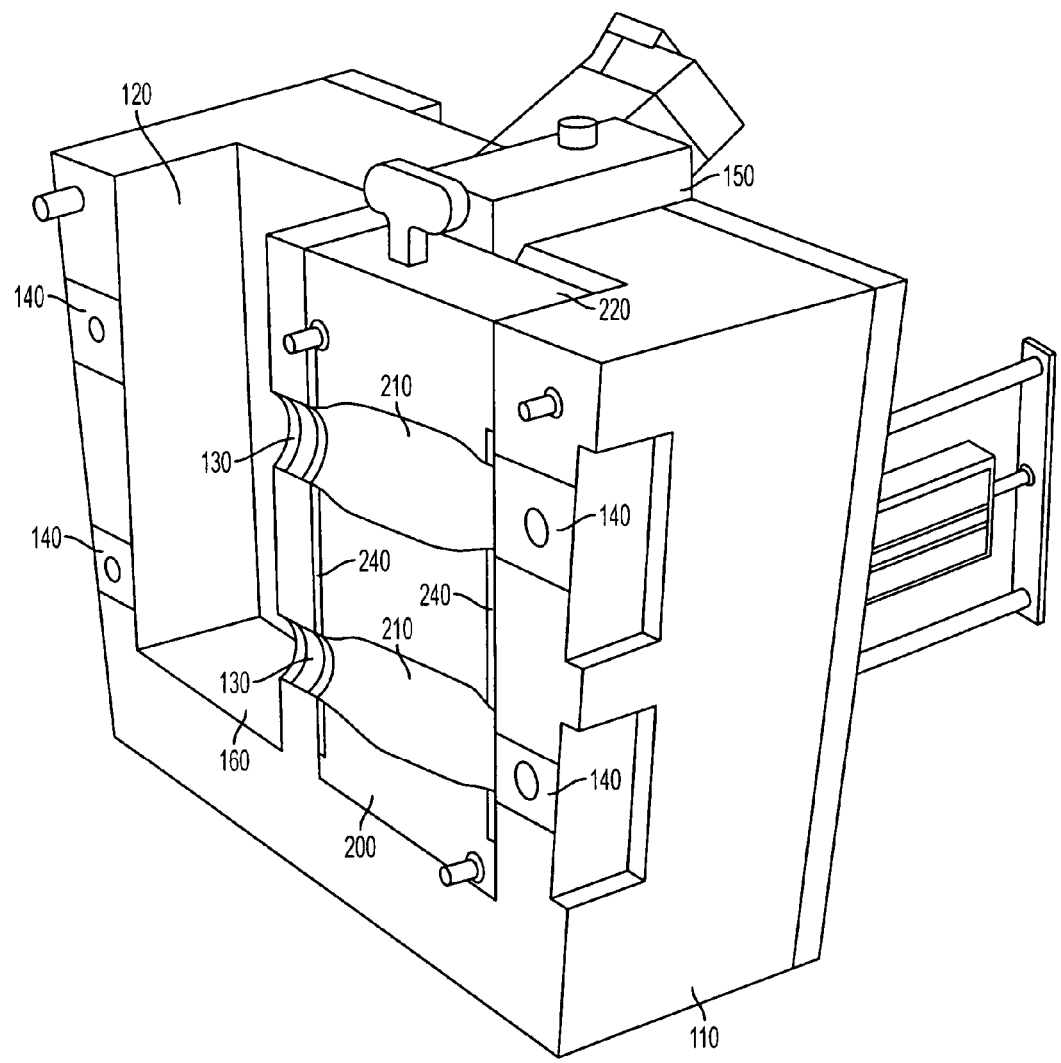
FIG. 2 is a perspective view of an example of a mold in accordance with the invention.

FIG. 2 shows a prospective view of an example of mold body 110 that holds two mold inserts 200. Each mold insert is positioned within an insert receiving region 120. FIG. 2 shows only one mold insert 200 in position so that insert receiving region 120 can be more clearly shown. In use, each of the two mold insert regions 120 contains a mold insert 200. Utility sources (such as air and cooling water) are connected to the mold body. Service of these utilities is connected to the inserts either directly or indirectly. The gas injected into the cavities can be through an opening in the inserts. Cooling water can either be circulated through the insert or contained within the mold body, where cooling is provided through conduction through the mold body material.

In the example shown in FIG. 2, each mold insert 200 is held in position by a locking element 150 that engages a locking recess 220 in the upper face of mold insert 200. An angled face 230 of mold insert 200 (shown in FIG. 4) interacts with an angled face 160 of insert receiving region 120 to, along with locking element 150, hold mold insert 200 in position within insert receiving region 120. Geometric compatibility would include angled, interlocking, or other nesting configurations as fitment between the insert and mold body.

Figure 3:
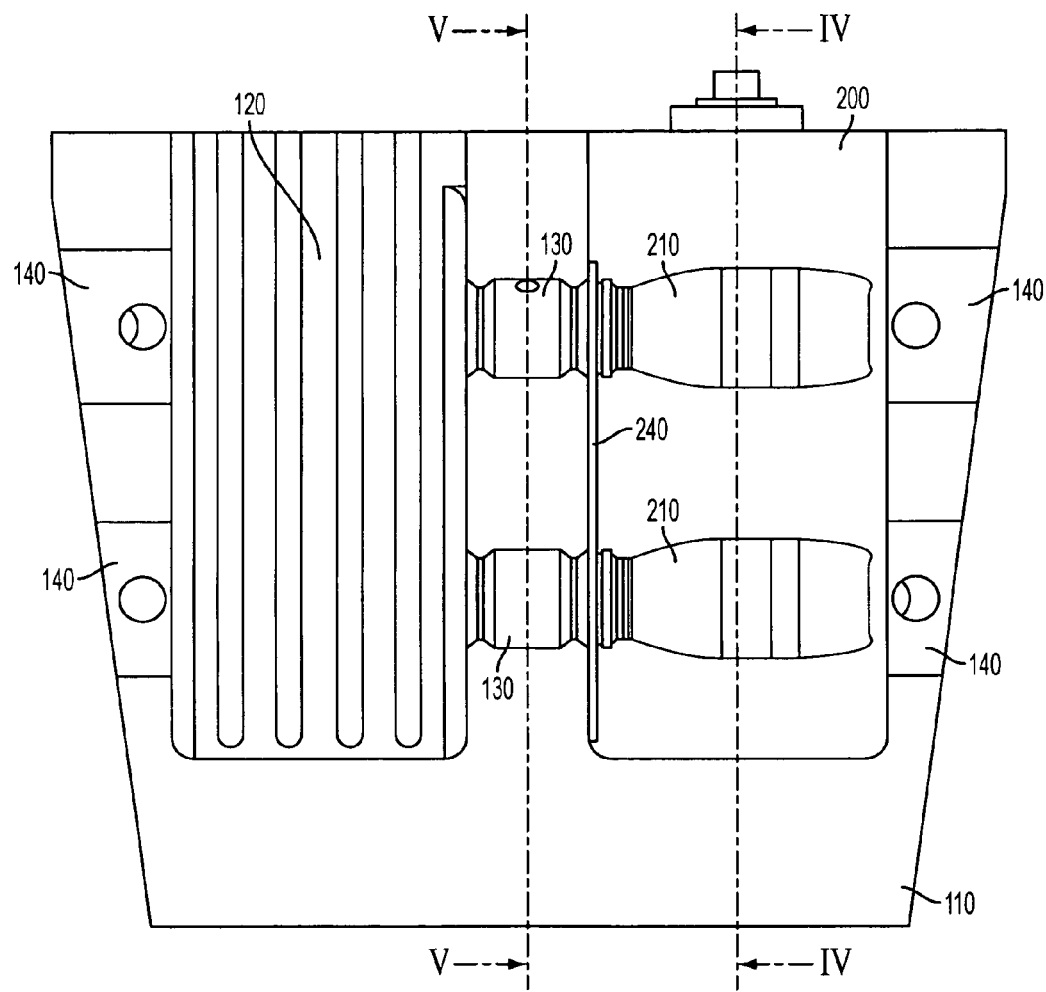
FIG. 3 shows a front view of an example of a mold in accordance with the invention.

FIG. 3 shows one mold insert 200 in position in the right insert receiving region 120 while showing the left insert receiving region 120 empty. As described above, when the mold is in use both insert receiving regions 120 contain a mold insert 200. Each mold insert 200 has at least one mold cavity 210 (in this example, two mold cavities 210 are shown). In the case where, as shown in FIG. 3, each mold insert 200 has two mold cavities 210, and mold body 110 holds two mold inserts 200, four bottles or containers will be produced with each use of the mold. Although two mold cavities 210 are shown in each mold insert 200 in this example, any number of mold cavities and mold inserts can be used. The example shown in FIG. 3 is for use with a dual parison wheel-type blow mold machine. While the example in FIG. 3 shows two insert receiving regions 120, it is noted that any number of insert receiving regions 120 can be used as long as mold body 110 is adapted accordingly. Although two mold cavities 210 are shown in each mold insert 200 in this example, any number of mold cavities and mold inserts can be used.

FIG. 3 shows two gas injection regions 130 formed in mold body 110. As shown in FIG. 2, gas injection regions 130 align with mold cavities 210 to produce a continuous cavity including mold cavity 210 of one mold insert 200, gas injection region 130 and mold cavity 210 of the other mold insert 200. Mold body 110 also has an ejection region 140 positioned adjacent to each mold cavity 210. In this example, mold insert 200 has edge pieces 240 that can be made of a different material (such as copper) that provides slip resistance. In use, a molten plastic tube, or parison, is fed between two opposing mold bodies 110 as the mold bodies are brought together and closed around the parison. The parison is then blown against the walls of mold cavities 210 and gas injection region 130 by, for example, a needle inserted into the parison in the gas injection region 130. In the example shown in FIGS. 2-6, two parisons are used, each being blown by a separate needle inserted in the respective gas injection region 130.

Figure 4:
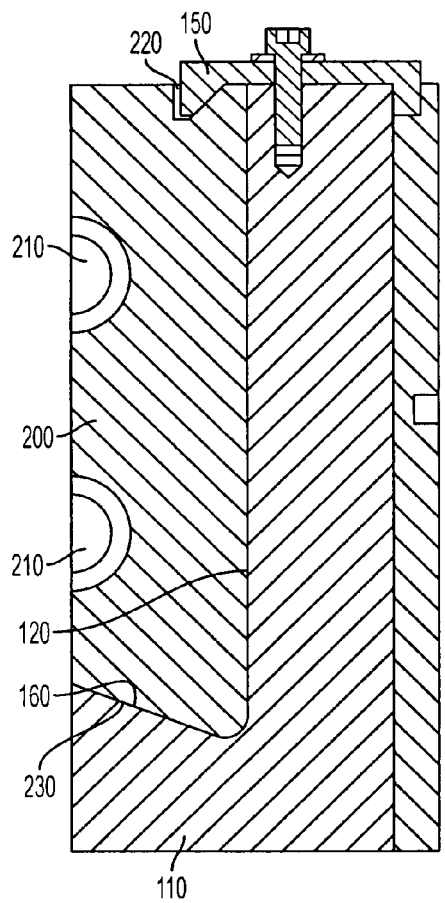
FIG. 4 shows a section along section line IV-IV in FIG. 3.

FIG. 4 is a sectional view taken along section line IV-IV in FIG. 3. FIG. 4 shows locking element 150 engaging locking recess 220 in mold insert 200 such that mold insert 200 is pressed into position within insert receiving region 120 of mold body 110. Angled face 230 of mold insert 200 engages angled face 160 of insert receiving region 120. Correct positioning of mold insert 200 is ensured by precise machining of mold insert 200 and insert receiving region 120. It is noted that other types of locking mechanisms can also be used. The inserts can be affixed to the mold bodies by geometric compliance (fitment) between the compatible surface of each entity or by auxiliary components (mechanical or electromechanical, for example), or by a combination of these.

Figure 5:
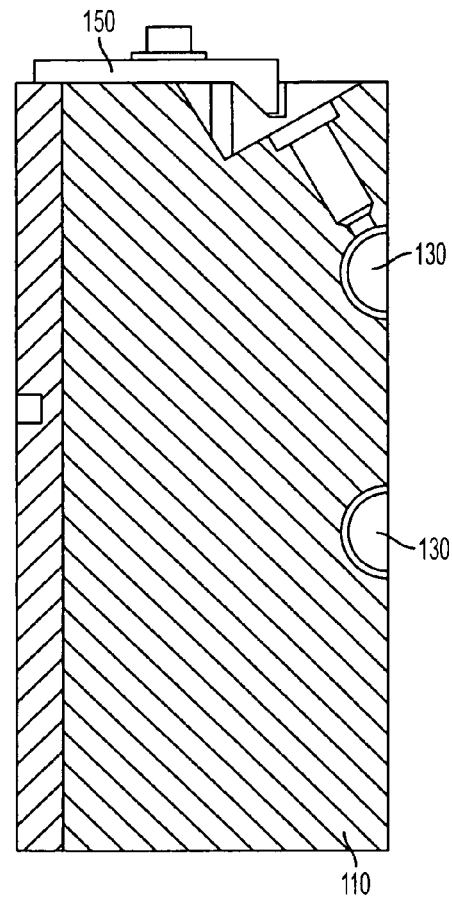
FIG. 5 shows a section along section line V-V in FIG. 3.

FIG. 5 shows a sectional view along section line V-V in FIG. 3. This section is through gas injection regions 130 and also shows locking element 150 in the background.

Figure 6:
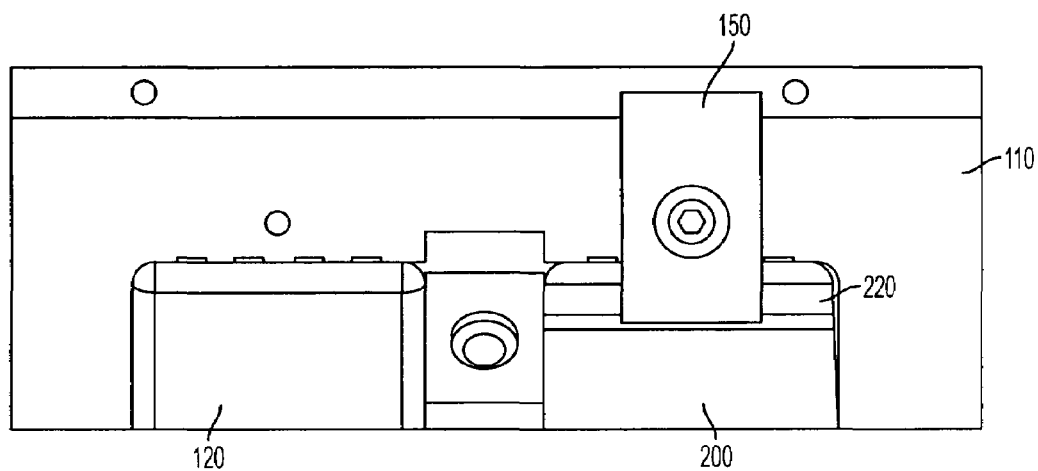
FIG. 6 shows a top view of the mold shown in FIG. 1.

FIG. 6 is a top view of the embodiment of the invention shown in FIG. 3. In FIG. 6, the insert receiving region 120 on the left hand side is empty whereas the insert receiving region 120 on the right hand side contains mold insert 200 held in place by locking element 150.

Figure 7:
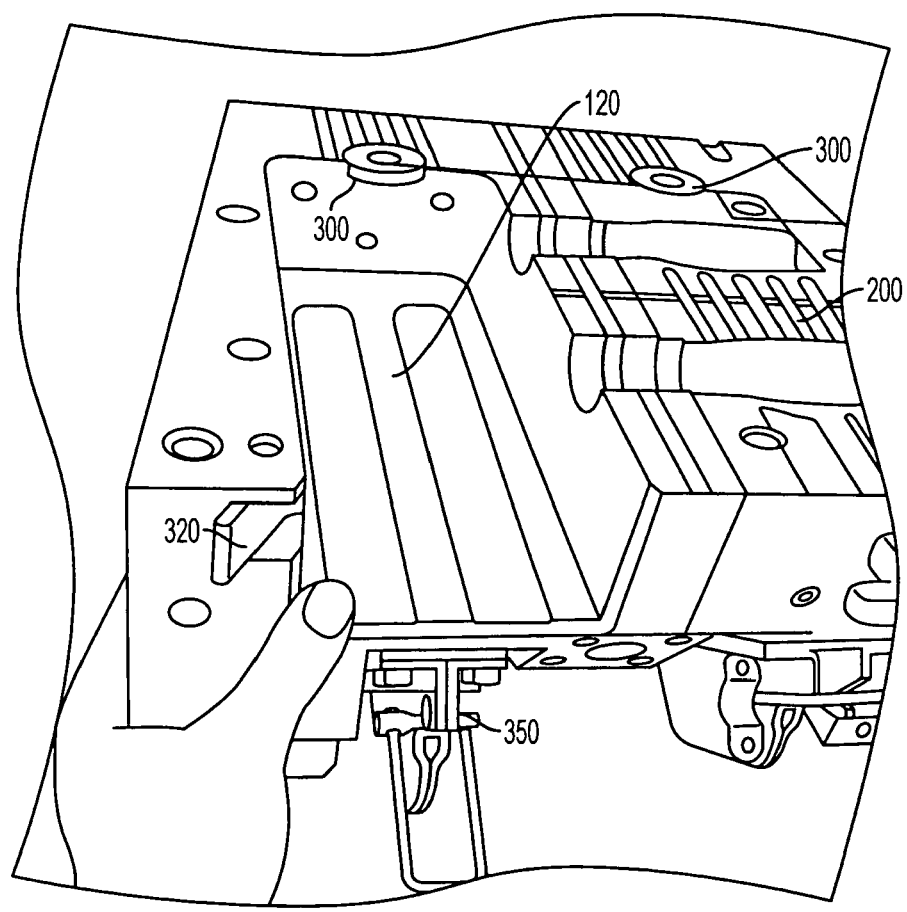
FIG. 7 shows an example of an alternate embodiment of the invention.
Figure 8:
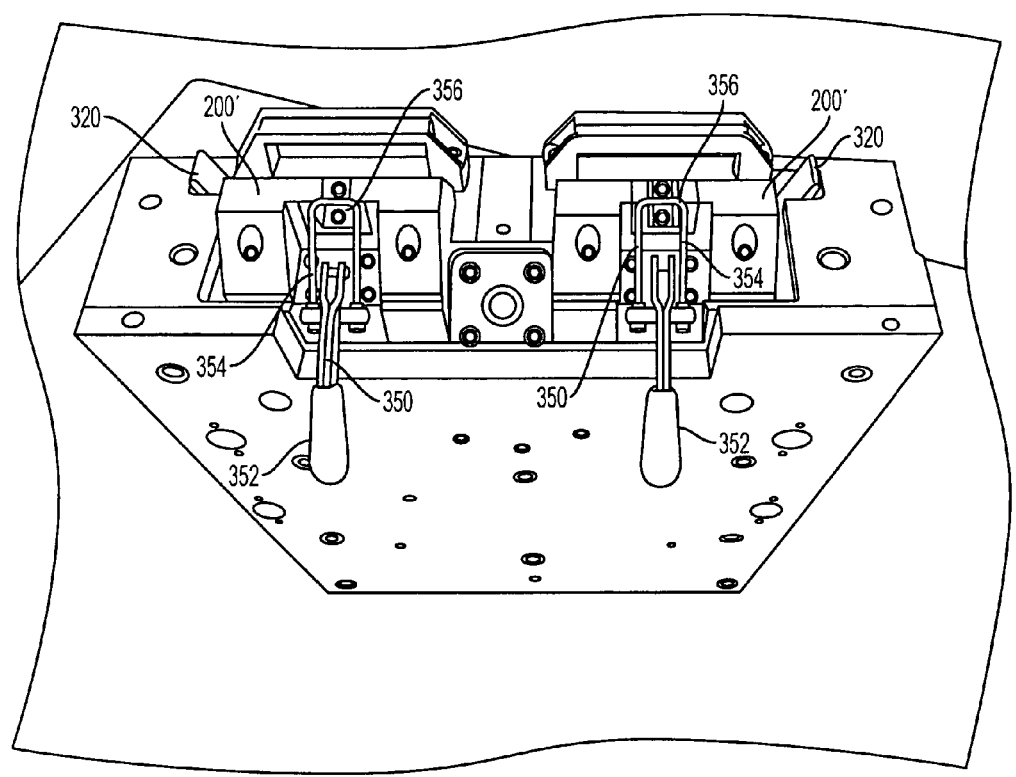
FIG. 8 shows the example shown in FIG. 7.

FIGS. 7 and 8 show an alternate embodiment of the invention in which locking element 150 is replaced by a locking element 350 which uses a clamping mechanism that is operable without the use of tools. Locking element 350 has a handle 352 which is connected to and operates a hooking loop 354 which, in turn, engages with a catch 356 mounted to mold insert 200'. By engaging hooking loop 354 with catch 356 and pulling down on handle 352, pressure is imparted in mold insert 200' and it is held firmly in place in insert receiving region 120.

FIG. 8 shows one insert receiving region 120 without a mold insert 200' in place and one insert receiving region 120 with a mold insert 200' in place. In this example, an insert retention element 300 is shown associated with each insert receiving region 120 to hold each mold insert 200' in place. Each insert receiving region 120 can also be provided with a security lock 320 for engaging mold insert 200' and holding it in place. Security lock 320 can be considered a back-up lock to help prevent damage to the mold inserts if the worker who is changing the mold inserts forgets to engage locking element 350.

It is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention.

The embodiments illustrated and discussed in this specification are intended only to teach those skilled in the art the best way known to the inventors to make and use the invention. Nothing in this specification should be considered as limiting the scope of the invention. All examples presented are representative and non-limiting. The above-described embodiments of the invention may be modified or varied, without departing from the invention, as appreciated by those skilled in the art in light of the above teachings. It is therefore to be understood that the invention may be practiced otherwise than as specifically described.

What is claimed is:

1. A mold insert set for use with a mold system having first and second mold bodies, the first and second mold bodies aligning opposite each other during a molding process, each of the mold bodies having at least one insert receiving region for replaceably receiving an insert of the mold insert set, each of the inserts comprising:
   an insert body;
   a mold cavity formed in the insert body, the mold cavity being for forming an object;
   an opening in the mold cavity for aligning with a gas injection region of the mold body in which the insert is received, the gas injection region being where blow gas is introduced to the mold cavity for forming the object;
   wherein the insert set comprises four of the inserts;
   a first insert and a second insert of the insert set are for being received in separate ones of the insert receiving regions of the first mold body;
   a third insert and a fourth insert of the insert set are for being received in separate ones of the insert receiving regions of the second mold body; and
   wherein each insert has two of the mold cavities formed in its insert body, each mold cavity being for forming a separate object.

2. The insert set of claim 1, wherein each mold cavity further comprises an opening for aligning with an ejection region of the mold body which receives the insert in which the mold cavity is formed.

3. The insert set of claim 1, wherein the openings in the mold cavities of the first and second inserts are for aligning with a gas injection region of the first mold body that is located between the insert receiving regions of the first mold body.

4. The insert set of claim 1, wherein each of the inserts further comprises a mechanical or electromagnetic mechanism on a first face of the insert, the mechanism being for locking the insert into position in one of the mold bodies.

5. The insert set of claim 4, wherein each of the inserts further comprises a surface shape compatible with or adjacent to the insert receiving region of one of the mold bodies.

6. The insert set of claim 4, wherein the mechanism is a latching element for receiving a latch mounted to the one of the mold bodies.

7. A mold system for forming at least one object, the system comprising;
   a first mold body having
      at least one insert receiving region;
      at least one gas injection region;
   a second mold body aligning with the first mold body and having
      at least one insert receiving region;
      at least one gas injection region;
   a plurality of mold inserts, each mold insert having
      an insert body;
      a mold cavity formed in the insert body, the mold cavity being for forming
         one of the at least one object;
      an opening in the mold cavity for aligning with one of the gas injection regions;
   wherein each of the mold inserts fits into one of the insert receiving regions, and
   the gas injection regions are for introducing blow gas from outside the mold bodies to each of the mold cavities for forming the at least one object;
   wherein the plurality of mold inserts comprises;
   a first insert and a second insert received in separate insert receiving regions of the first mold body;
   a third insert and a fourth insert received in separate insert receiving regions of the second mold body; and
   wherein each insert has two of the mold cavities formed in its insert body, each mold cavity being for forming a separate object.

8. The mold system of claim 7, wherein each mold cavity further comprises an opening that aligns with an ejection region of the mold body which receives the insert in which the mold cavity is formed.

9. The mold system of claim 7, wherein the gas injection region of the first mold body is located between the insert receiving regions of the first mold body.

10. The mold system of claim 7, wherein each of the inserts further comprises a locking recess in a first face of the insert, the locking recess receiving a locking element that locks the insert into position in one of the mold bodies.

11. The mold system of claim 10, wherein each of the inserts further comprises an angled face opposite the first face, the angled face interacting with an angled face of the insert receiving region of one of the mold bodies.

12. The mold system of claim 7, wherein each of the inserts further comprises a latch receiving element and each of the mold bodies further comprises at least one latch that latches to one of the latch receiving elements to lock the inserts in place in the mold bodies.

13. The mold system of claim 12, wherein the latch is hand operable by a user of the mold system.

14. The mold system of claim 7, wherein each of the mold bodies has a self engaging security lock that engages one of the inserts to hold the inset in place in the insert receiving region.

15. An extrusion-type blow mold machine, comprising;
   machine platens;
   a plurality of two-part molds attached to the machine platens, each two-part mold having;
   a first mold body having at least one insert receiving region and at least one gas injection region;
   a second mold body aligning with the first mold body and having at least one insert receiving region and at least one gas injection region;
   a plurality of mold inserts, each mold insert having
      an insert body;
      a mold cavity formed in the insert body, the mold cavity being for forming at least one object;
      an opening in the mold cavity for aligning with one of the gas injection regions;
   wherein the plurality of mold inserts comprises;
   a first insert and a second insert received in separate insert receiving regions of the first mold body, and
   a third insert and a fourth insert received in separate insert receiving regions of the second mold body; and
   wherein each insert has two of the mold cavities formed in its insert body, each mold cavity being for forming a separate object.

16. The machine of claim 15, wherein each mold cavity further comprises an opening that aligns with an ejection region of the mold body which receives the insert in which the mold cavity is formed.

17. The machine of claim 15, wherein the gas injection region of the first mold body is located between the insert receiving regions of the first mold body.

18. The machine of claim 15, wherein each of the inserts further comprises a locking feature in a first face of the insert, the locking feature receiving a locking element that locks the insert into position in one of the mold bodies.

19. The machine of claim 15, wherein each of the inserts further comprises a latch receiving element and each of the mold bodies further comprises at least one latch that latches to one of the latch receiving elements to lock the inserts in place in the mold bodies.

20. The machine of claim 19, wherein the latch is hand operable by a user of the mold system.

21. The machine of claim 15, wherein each of the mold bodies has a self engaging security lock that engages one of the inserts to hold the inset in place in the insert receiving region.

\* \* \* \* \*